(12) United States Patent
Nicolas et al.

(10) Patent No.: US 7,558,596 B2
(45) Date of Patent: Jul. 7, 2009

(54) PHONEBOOK MANAGEMENT METHOD IN A MOBILE TERMINAL AND THE ASSOCIATED TERMINAL

(75) Inventors: Cédric Nicolas, Paris (FR); Stéphane Smierzchalski, Paris (FR)

(73) Assignee: Bouygues Telecom, Boulogne Billancourt (FR)

( * ) Notice: Subject to any disclaimer, the term of this patent is extended or adjusted under 35 U.S.C. 154(b) by 421 days.

(21) Appl. No.: 11/330,813

(22) Filed: Jan. 11, 2006

(65) Prior Publication Data
US 2006/0154656 A1 Jul. 13, 2006

(30) Foreign Application Priority Data
Jan. 12, 2005 (FR) .................................. 05 00292

(51) Int. Cl.
*H04M 1/00* (2006.01)
(52) U.S. Cl. ................. 455/550.1; 455/425; 455/556.2; 455/412.1; 455/422.1; 711/100
(58) Field of Classification Search .............. 455/550.1, 455/425, 556.2, 412.1, 422.1; 711/100
See application file for complete search history.

(56) References Cited

U.S. PATENT DOCUMENTS 7,146,161 B2 * 12/2006 Chou .......................... 455/418
7,305,077 B2 * 12/2007 Takae et al. ............. 379/201.12
2004/0029568 A1 * 2/2004 DeLuca et al. ............ 455/412.1
2005/0003809 A1 * 1/2005 Kato ........................... 455/415
2005/0204353 A1 * 9/2005 Ji ................................ 717/168
2006/0058014 A1 * 3/2006 Seo et al. ..................... 455/418
2006/0156052 A1 * 7/2006 Bodnar et al. .................. 714/2
2006/0178133 A1 * 8/2006 Kim ......................... 455/412.1

FOREIGN PATENT DOCUMENTS

| DE | 10146664 | | 2/2003 |
| EP | 0 982 913 | A2 | 3/2000 |
| EP | 1 024 674 | A1 | 8/2000 |
| FR | 2 749 464 | A1 | 12/1997 |
| WO | WO 98/30053 | | 7/1998 |
| WO | WO 00/79773 | A1 | 12/2000 |
| WO | WO 03/045089 | A1 | 5/2003 |

* cited by examiner

*Primary Examiner*—Joseph H Feild
*Assistant Examiner*—Huy D Nguyen
(74) *Attorney, Agent, or Firm*—Blakely, Sokoloff, Taylor & Zafman LLP

(57) ABSTRACT

The invention concerns a method for managing phonebooks in a mobile terminal (200) containing a first phonebook (241) and a second phonebook (221), characterised in that it includes the steps consisting in:
 detecting (61) whether a user is changing information contained in the first phonebook (241),
 copying (66) the changed information into the second phonebook (221).

Figure 1:
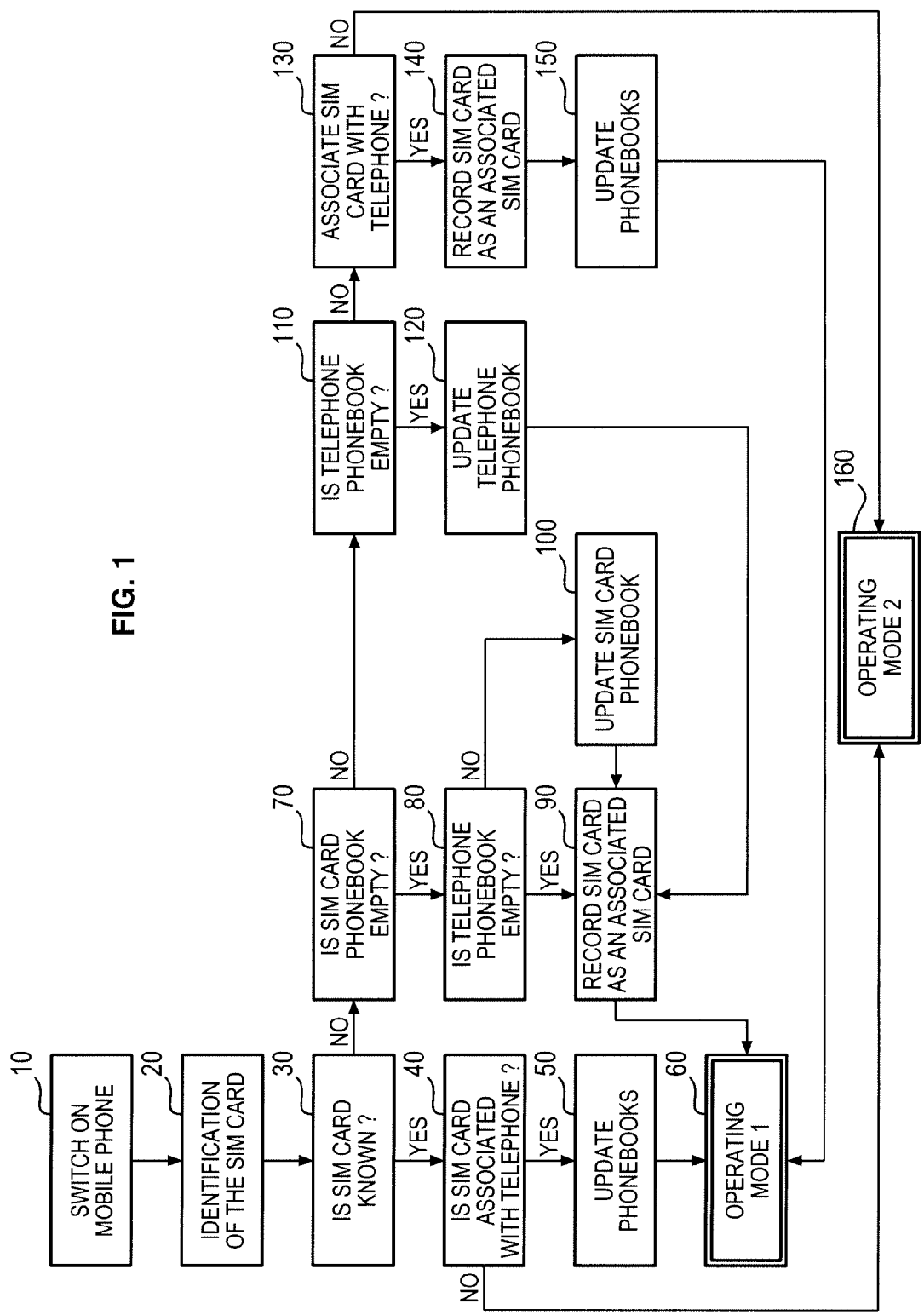

The invention also concerns a cellular mobile terminal, characterised in that it includes processing resources programmed to implement this method.

10 Claims, 4 Drawing Sheets

PHONEBOOK MANAGEMENT METHOD IN A MOBILE TERMINAL AND THE ASSOCIATED TERMINAL

The invention concerns the field of mobile telephony.

In particular, it concerns management of the phonebooks in a mobile telephone.

When the user of a mobile telephone wishes to record a contact in his mobile telephone, he has a choice between several phonebooks. For example, he can record the contact in the phonebook of his SIM (Subscriber Identity Module) card or in a phonebook of the telephone itself.

One advantage of the SIM card is that it can be used in different mobile telephones. In particular, when the user changes his mobile telephone, he is able to transfer his SIM card to his new mobile telephone and thus preserve his contacts phonebook.

However, one disadvantage of the SIM card is that it has limited memory capacity and so therefore the phonebook that it can contain is limited in size. This is why the 2G and 3G SIM cards, which are intended to replace the SIM cards used currently, are designed to have larger memories.

Nevertheless, the phonebook in the telephone is generally larger and also has more fields than the phonebook on the SIM card.

It has been observed that the users of mobile telephones have a tendency to confuse the different phonebooks. For example, It is difficult for users to remember that a particular contact has been recorded in one or the other of the phonebooks.

Frequently, when a user changes his mobile telephone, he notices that he has lost certain contacts which were recorded in the phonebook of his old mobile telephone.

One aim of the invention is to simplify the use of the phonebooks for the user.

To this end, the invention proposes a method for managing phonebooks in a mobile terminal containing a first phonebook and a second phonebook, characterised in that it includes the steps consisting in:
  detecting that a user has changed information contained in the first phonebook,
  copying the changed information into the second phonebook.

The method of the invention allows the user to change the data in one phonebook only, with the changes being automatically transferred into the other phonebook.

The method can also include a step which, if the second phonebook is full, displays a warning message on a screen of the mobile terminal.

In one implementation of the method, only information contained in the first phonebook can be changed by the user.

In one implementation of the method, the first phonebook is a phonebook recorded in memory resources of the terminal and the second phonebook is a phonebook recorded in removable memory resources, such as a SIM card.

The method can include preliminary initialisation steps consisting of:
  recording, in the memory resources of the terminal, data that identifies removable memory resources associated with the terminal,
  when a user switches on the terminal, determining if the removable memory resources present in the terminal are associated with the mobile terminal,
  if the removable memory resources present in the terminal are associated with the terminal, activating a first operating mode of the terminal in which the terminal executes the steps of the method for managing phonebooks of the invention.

The method can also include a step consisting of displaying a proposal that can be selected by a user to save data identifying the removable memory resources present in the terminal as associated removable memory resources.

The method can also include steps consisting of determining whether one of the phonebooks is empty, and then if one of the phonebooks is empty, copying information from the other phonebook into the empty phonebook.

The method can also include the step which, if the removable memory resources present in the terminal are not associated with the terminal, activates a second operating mode in which a user can modify only data contained in the second phonebook.

The method can also include a step consisting of updating the first and/or the second phonebook before activating the first operating mode.

In one implementation of the method of the invention, updating the first phonebook includes sub-steps consisting of:
  determining whether the second phonebook has been changed,
  if the second phonebook has been changed, copying the changes from the second phonebook into the first phonebook.

The method can include a sub-step consisting of determining, for each entry in the second phonebook, a control parameter associated with the entry and comparing the control parameter thus determined with a control parameter recorded in the memory resources of the terminal, in order to deduce whether the entry has been changed.

In addition, the step for updating of the second phonebook can include sub-steps consisting of:
  determining whether the first phonebook has been changed,
  if the first phonebook has been changed, copying the changes from the first phonebook into the second phonebook.

In particular, the method can include the sub-step consisting of determining, for each entry in the first phonebook, if there are any changes recorded in the mobile telephone as a change in progress.

The invention also relates to a cellular mobile terminal, characterised in that it includes methoding resources programmed to implement the aforementioned phonebook management method.

Figure 2:
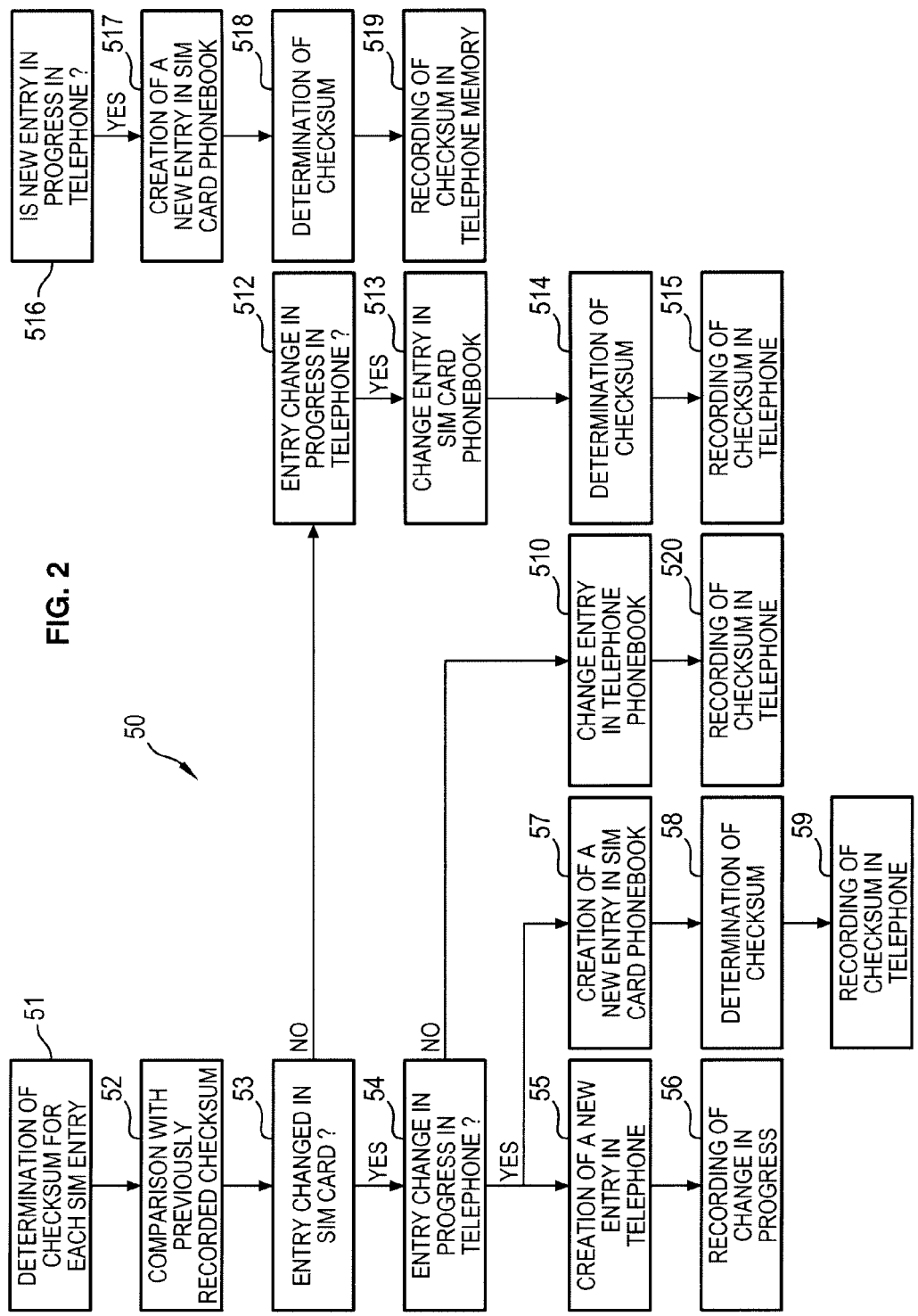
Figure 3:
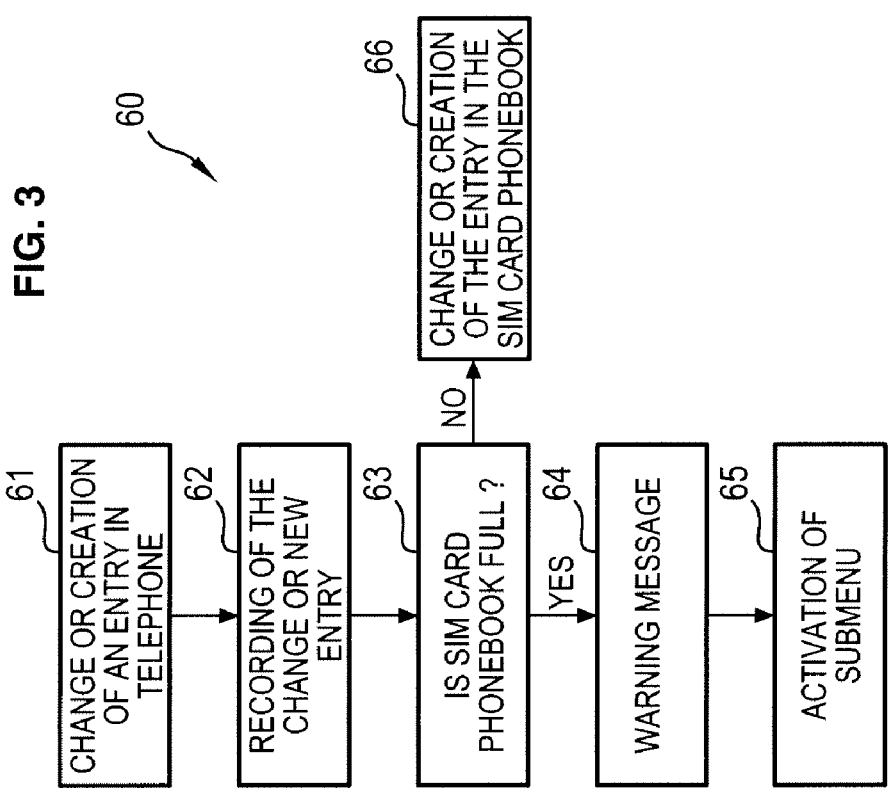
Figure 4:
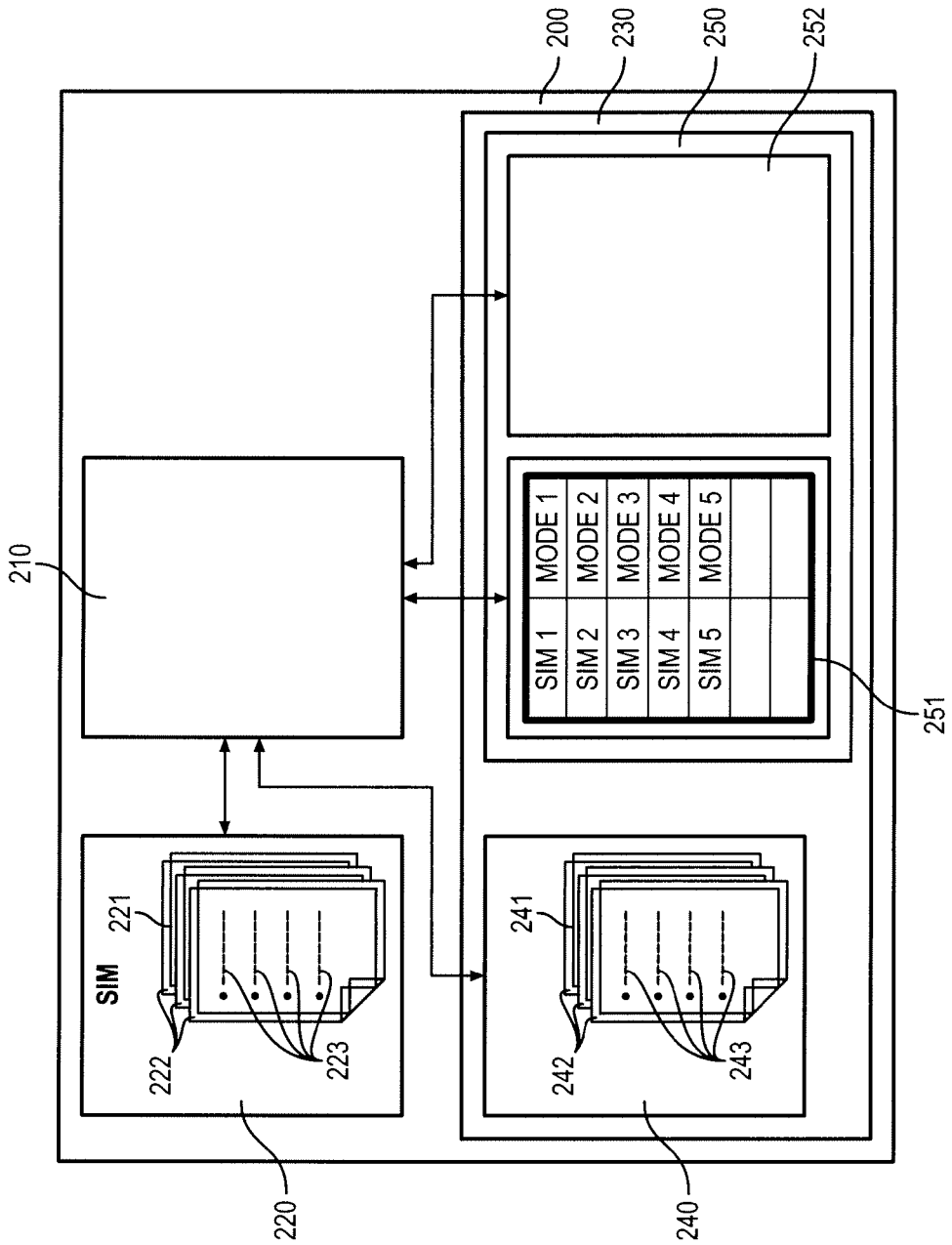

Other characteristics and advantages will emerge from the description that follows, which is purely illustrative and non-limitative, and which should be read with reference to the appended figures in which:

FIG. 1 is a flow diagram diagrammatically representing a method for initializing a mobile telephone according to one embodiment of the invention, FIG. 2 is a flow diagram diagrammatically representing the sub-steps of a step for updating the phonebooks of the method of FIG. 1, FIG. 3 is a flow diagram diagrammatically representing a method for managing the phonebooks in a mobile telephone, according to a first operating mode, FIG. 4 diagrammatically illustrates a mobile telephone capable of implementing the method of FIGS. 1 to 3.

In the remainder of the present specifications, the term "phonebook" refers to a list of entries stored in a location provided for this purpose, in the mobile telephone or in the SIM card for example.

The term "entry" refers to a series of data which are generally associated with a given person or a given contact in the phonebook.

Each entry includes information classified in "fields" or headings. Each field generally corresponds to an attribute of a contact. The fields include, for example, the surname, the first name, the mobile telephone number, the fixed telephone number, the fax number, the e-mail address, a photo of the person, and so on.

In FIG. 1, the method for initializong the mobile telephone is triggered automatically when the mobile telephone is switched on. This initialisation method leads to the selection of an operating mode for the mobile telephone (called the "associated operating mode" and the "dissociated operating mode").

There are thus two operating modes of the mobile telephone which correspond to two possible configurations of the latter.

According to a first configuration, the mobile telephone contains a SIM card associated with the mobile telephone. In this case, the mobile telephone selects the associated operating mode in which the user has access only to the mobile telephone phonebook. Also, in this operating mode, the SIM card phonebook is updated automatically in accordance with the changes made to the entries contained in the mobile telephone phonebook. Operation of the mobile telephone is therefore simplified for the user, to whom only the mobile telephone phonebook is visible.

According to a second configuration, the mobile telephone contains a SIM card which is not a one that is associated with the mobile telephone. This is the case, for example, when a second user borrows the mobile telephone from the first user and inserts his own SIM card in the mobile telephone. In this case, the mobile telephone selects the dissociated operating mode in which the user has access only to the SIM card phonebook, and in which only the SIM card phonebook can be changed.

The initialisation method of the mobile telephone includes the following steps:

According to a first step 10, the mobile telephone is switched on by a user. The effect of switching on the mobile telephone is to trigger a programme which orders the automatic execution of the following steps.

According to a second step 20, the mobile telephone identifies the SIM card present in the mobile telephone. To this end, the mobile telephone reads the serial number (called ICCID) of the card.

According to a third step 30, the mobile telephone determines whether the SIM card is a known SIM card.

The mobile telephone contains a plurality of known SIM cards serial numbers, recorded in a memory of the mobile telephone. The mobile telephone compares the serial number of the SIM card present in the mobile telephone with each of the serial numbers recorded. The mobile telephone thus deduces whether the SIM card is known or not.

If the SIM card is known, the mobile telephone executes a fourth step 40 according to which the mobile telephone determines whether the SIM card is a SIM card associated with the mobile telephone.

Among the numbers recorded in the memory of the mobile telephone, one or more of the numbers are recorded as SIM card numbers associated with the mobile telephone, while the other numbers are recorded as dissociated numbers. For example, the mobile telephone contains two associated SIM card numbers (SIM 1 and SIM 2) chosen by the user.

If the SIM card is one that is associated with the mobile telephone, the mobile telephone then executes a fifth step 50 for updating the phonebooks of the SIM card and of the mobile telephone. This step is used to match the content of the two phonebooks in order to simplify the use of these phonebooks by the user. The fifth step 50 includes sub-steps which will be described later with reference to FIG. 2.

According to a sixth step 60, the mobile telephone selects a first operating mode (operating mode 1) called an "associated operating mode", in which the user has access only to the mobile telephone phonebook, and in which the SIM card phonebook is updated automatically according to the changes made to the entries contained in the mobile telephone phonebook.

If, during the fourth step 40, the mobile telephone determines that the SIM card is not an associated SIM card, the mobile telephone executes a sixteenth step 160, according to which the mobile telephone selects the second mode (operating mode 2) called the "dissociated operating mode".

If, during the third step 30, the mobile telephone determines that the SIM card is not known, then the mobile telephone executes a seventh step 70 according to which the mobile telephone determines whether the SIM card phonebook is empty.

If the SIM card phonebook is empty, this means that the user has inserted an empty SIM card into the mobile telephone. In this case, the mobile telephone performs an eighth step 80, according to which the mobile telephone determines whether the mobile telephone phonebook is empty.

If the mobile telephone phonebook is empty, then the mobile telephone executes a ninth step 90, according to which it records the number of the SIM card as an associated SIM card number.

Then the mobile telephone executes the sixth step 60, according to which the mobile telephone selects the first operating mode (the "associated" operating mode).

If, during the eighth step 80, the mobile telephone determines that the mobile telephone phonebook contains entries, then, the mobile telephone executes a tenth step 100, according to which the mobile telephone updates the SIM card phonebook. To this end, the mobile telephone copies the entries contained in the mobile telephone phonebook into the SIM card phonebook.

If the SIM card phonebook contains fewer fields than the mobile telephone phonebook, the mobile telephone copies only the identical fields.

Then the mobile telephone executes the ninth step 90, according to which it records the number of the SIM card as an associated SIM card number.

It will be observed that the ninth step 90 will be executed only if the number of the SIM cards associated with the mobile telephone is lower than a predetermined acceptable number. Optionally, the mobile telephone can erase an associated SIM card number from the memory of the mobile telephone, and replace it with the number of the SIM card present in the telephone.

Then the mobile telephone executes the sixth step 60, according to which the mobile telephone selects the first operating mode (operating mode 1) called the "associated operating mode".

If, during the seventh step 70, the mobile telephone determines that the SIM card phonebook contains entries, then the mobile telephone executes an eleventh step 110 according to which the mobile telephone determines whether the mobile telephone phonebook is empty.

If the mobile telephone phonebook is empty, then the mobile telephone executes a twelfth step 120 according to which the mobile telephone updates the mobile telephone phonebook. To this end, the mobile telephone copies the content of the SIM card phonebook into the mobile telephone phonebook.

Then the mobile telephone executes the ninth step 90, according to which it records the number of the SIM card as an associated SIM card number.

Then the mobile telephone executes the sixth step 60, according to which the mobile telephone selects the first operating mode (operating mode 1) called the "associated operating mode".

If, during the eleventh step 110, the mobile telephone determines that the mobile telephone phonebook contains entries, then the mobile telephone executes the thirteenth step 130 in which the mobile telephone displays a message on a screen of the mobile telephone proposing to the user that he should associate the SIM card with the mobile telephone. The mobile telephone displays a message of the type "Do you wish to associate the SIM card with the telephone?" as well as two proposals for a response, namely "YES" or "NO".

If the user wishes to associate the SIM card with the mobile telephone, he commands the mobile telephone to select the "YES" response. In this case, the mobile telephone executes a fourteenth step 140 which is identical to the ninth step 90. According to this fourteenth step 140, the mobile telephone records the number of the SIM card as an associated SIM card number Then the telephone executes a fifteenth step 150 similar to the fifth step 50. The fifteenth step 150 is a step for updating the phonebooks of the SIM card and of the mobile telephone. This step is used to match the content of the two phonebooks in order to simplify the use of these phonebooks by the user.

Then the mobile telephone executes the sixth step 60, according to which the mobile telephone selects the first operating mode (operating mode 1) called the "associated operating mode".

If, during the thirteenth step 130, the user does not wish to associate the SIM card with the mobile telephone, he commands the mobile telephone to select the "NO" response. In this case, the mobile telephone executes the sixteenth step 160, according to which the mobile telephone selects the second operating mode.

The method that has just been described is used to automatically associate a new SIM card with the mobile telephone when one of the phonebooks is empty and the other phonebook contains entries.

In addition, the method that has just been described allows the user to associate a new SIM card with the mobile telephone when the SIM card phonebook and the telephone phonebook both contain entries.

FIG. 2 illustrates the sub-steps of the step 50 for updating of the mobile telephone phonebook in the method of FIG. 1.

Sub-steps 51 to 515 are executed for each entry in the SIM card phonebook, whether this entry is empty or contains data.

Sub-steps 516 to 519 are executed for each new entry recorded as a new entry in progress in the memory resources of the mobile telephone.

According to a first sub-step 51, for each entry contained in the SIM card phonebook, the mobile telephone calculates a control parameter called "checksum" associated with the entry. The control parameter is a value that is calculated, according to a predetermined formula, from the data associated with each field of the entry. For example, the control parameter is a number coded in at least 4 bits (e.g. a CRC32 code) so as to allow correct detection of the changes in the entries of the SIM card phonebook.

According to a second sub-step 52, the mobile telephone compares the control parameter calculated during the first sub-step 51 with a control parameter calculated previously for the same entry, and records it in the memory of the mobile telephone. The comparison between the control parameters allows the mobile telephone to detect whether the entry has been changed.

According to a third sub-step 53, the mobile telephone thus deduces whether the entry has been changed in the SIM card phonebook.

If the entry has been changed, then the mobile telephone executes a fourth sub-step 54 according to which the mobile telephone determines whether there are changes in progress recorded in the mobile telephone for the entry concerned.

If there are changes in progress recorded in the mobile telephone for this entry, then the mobile telephone executes a fifth sub-step 55 which the mobile telephone copies the data of the changed entry contained in the SIM card into an empty entry in the mobile telephone phonebook.

Then according to a sixth sub-step 56, the mobile telephone records the changed entry as a new entry in progress in the memory resources of the mobile telephone.

In addition, according to a seventh sub-step 57, the mobile telephone copies the changed entry into a new empty entry in the SIM card phonebook.

According to an eighth sub-step 58, the telephone calculates a control parameter associated with the entry created.

Then according to a ninth sub-step 59, the mobile telephone records a control parameter calculated for the new entry in a memory of the mobile telephone.

If, during the fourth sub-step 54, the mobile telephone determines that there is no change in progress recorded in the mobile telephone, then the mobile telephone executes a tenth sub-step 510 according to which the mobile telephone updates the mobile telephone phonebook. To this end, the mobile telephone copies the entry in the SIM card phonebook into the mobile telephone phonebook.

Then the mobile telephone executes an eleventh sub-step 511 according to which the mobile telephone records, in a memory of the mobile telephone, the control parameter calculated for the entry during the first sub-step 51.

If, during the third sub-step 53, the mobile telephone determines that no modification has been made to the entry in the SIM card phonebook, then the mobile telephone executes a twelfth sub-step 512 according to which the mobile telephone determines whether there are changes in progress recorded in the mobile telephone for the entry concerned.

If there are changes in progress recorded in the mobile telephone for this entry, then the mobile telephone executes a thirteenth sub-step 513 according to which the mobile telephone updates the SIM card phonebook. To this end, the mobile telephone copies the entry in the mobile telephone phonebook into the SIM card phonebook.

Then the mobile telephone executes a fourteenth sub-step 514 according to which the telephone calculates a control parameter associated with the changed entry.

Then the mobile telephone executes a fifteenth step 515 according to which the mobile telephone records a control parameter calculated for the changed entry in a memory of the mobile telephone.

According to a sixteenth sub-step 516, the mobile telephone determines whether there is a new entry recorded as a new entry in progress in the memory resources of the mobile telephone.

If this is the case, then the mobile telephone executes a seventeenth sub-step 517 according to which the mobile telephone creates a new entry in the SIM card phonebook and copies the data of the new entry in progress into the new entry in the phonebook on the card.

Then according to a eighteenth sub-step 518, the mobile telephone calculates a control parameter associated with the entry created.

Then according to a nineteenth sub-step 519, the mobile telephone records a control parameter calculated for the new entry in a memory of the mobile telephone.

The "Associated" Operating Mode

FIG. 3 diagrammatically illustrates the steps of a method for managing the phonebooks of a mobile telephone, when the mobile telephone is operating in the associated mode (operating mode 1).

In this operating mode, the user has access only to the mobile telephone phonebook.

According to a first step 61, let us assume that the user is changing an entry in the mobile telephone phonebook. For example, the user is creating a new entry in which he is placing data relating to a new contact, or is changing the data in an existing entry.

The change to the mobile telephone phonebook automatically triggers the execution of the following steps.

According to a second step 62, the mobile telephone records the new entry or the changed entry as a changed entry in progress in the memory resources of the mobile telephone.

According to a third step 63, the mobile telephone determines whether the phonebook of the SIM card is full.

The SIM card phonebook is full when it is no longer possible to record or add new entries, due to the limited capacity of the memory on the SIM card.

If, during the third step 63, the mobile telephone determines that the SIM card phonebook is not full, then the mobile telephone executes a sixth step 66 according to which the mobile telephone updates the SIM card phonebook. To this end, the mobile telephone copies the entries of the mobile telephone phonebook into the SIM card phonebook.

If the SIM card phonebook is full, then according to a fourth step 64, the mobile telephone displays a warning message on a screen, indicating that the SIM card phonebook is full and that the new data will be recorded in the mobile telephone phonebook only.

According to a fifth step 65, the mobile telephone triggers the activation of a special sub-menu.

This special sub-menu corresponds to the return to a conventional operating mode of the mobile telephone. In this operating mode, the user has access to the SIM card phonebook and to the mobile telephone phonebook independently.

The "Dissociated" Operating Mode

In the dissociated operating mode (operating mode 2), the user has access only to the SIM card phonebook present in the mobile telephone, and can modify only the SIM card phonebook. He does not have access to the mobile telephone phonebook.

On each insertion of a different SIM card into the mobile telephone, the serial number of the SIM card is recorded in the memory of the mobile telephone as a dissociated number.

FIG. 4 illustrates a mobile telephone 200 that includes a software layer 210 in which a program is recorded which is capable of executing the steps of the method that have just been described. The steps of the method for initialisation of the mobile telephone are executed automatically when the mobile telephone is switched on.

The mobile telephone 200 also contains a SIM card 220 in which a phonebook 221 is recorded, the phonebook being composed of a plurality of entries 222, each entry containing a series of data organised into fields 223.

The mobile telephone 200 includes memory resources 230, where these memory resources 230 include a section 240 containing the mobile telephone phonebook 241, with the phonebook 241 being composed of a plurality of entries 242, each entry containing a series of data organised into fields 243.

The memory resources 230 also include a section 250 in which are recorded the serial numbers 251 of the SIM cards known to the mobile telephone as well as an operating mode in relation to each of these SIM cards (associated operating mode or dissociated operating mode). In FIG. 4, two SIM cards (SIM 1 and SIM 2) from among the known the SIM cards are SIM cards that are associated with the mobile telephone 200.

The memory resources 230 also include a section 252 in which the control parameters associated with each entry 222 in the phonebook of the SIM card associated with the mobile telephone and the changes in progress in the phonebook 241 of the mobile telephone can be recorded.

The invention claimed is:

1. A method for managing phonebooks in a mobile terminal (200) containing a first phonebook (241) and a second phonebook (221) wherein the first phonebook (241) is a phonebook recorded in memory resources (230) of the terminal (200), and the second phonebook (221) is a phonebook recorded in removable memory resources (220), the method including preliminary initialization steps of:

recording { (90), in the memory resources (230) of the terminal (200), data identifying memory resources associated with the terminal (200), when a user switches on the terminal, determining (40) whether the removable memory resources (220) present in the terminal (200) are associated with the mobile terminal (200), and if the removable memory resources (220) present in the terminal (200) are associated with the terminal (200), activating (60) a first operating mode of the terminal (200) wherein the terminal executes the steps of: detecting (161) whether a user is changing information contained in the first phonebook (241), copying (66) the changed information into the second phonebook (221), wherein the method also includes a step of displaying (130) a proposal that can be selected by a user to record data identifying the removable memory resources (220) present in the terminal (200) as associated removable memory resources, wherein the method also includes a step of, if the removable memory resources (220) present in the terminal (200) are not associated with the terminal (200), activating (160) a second operating mode wherein a user can change only data (223) contained in the second phonebook (221).

2. The method according to claim 1, including, in addition, the step of, if the second phonebook (221) is full, displaying a warning message (64) on a screen of the mobile terminal (200).

3. The method according to claim 1, wherein only information contained in the first phonebook can be changed by the user.

4. The method according to claim 1, including steps of determining (70, 80, 110) whether one of the phonebooks (221, 241) is empty and if one of the phonebooks is empty, copying information from the other phonebook into the empty phonebook.

5. The method according to claim 1, including a step of updating (50, 150) the first and/or second phonebook (241, 221) before activating (60) a first operating mode wherein the user has access only to the first phonebook (241).

6. The method according to claim 5, wherein updating (50, 150) the first phonebook (241) includes sub-steps of:
- determining (53) whether the second phonebook (221) has been changed,
- if the second phonebook has been changed, copying (55, 510) the changes from the second phonebook (221) into the first phonebook (241).

7. The method according to claim 6, including a sub-step of determining (51), for each entry (222) in the second phonebook (221), a control parameter associated with that entry, and comparing (52) the control parameter thus determined with a control parameter recorded in memory resources of the terminal, in order to deduce whether the entry has been changed.

8. The method according to claim 5, wherein the step for updating the second phonebook (221) includes sub-steps of:
- determining (54, 512, 516) whether the first phonebook (241) has been changed,
- if the first phonebook (241) has been changed, copying (57, 513, 517) the changes from the first phonebook (241) into the second phonebook (221).

9. The method according to claim 8, including a sub-step (54, 512, 516) of determining, for each entry (242) in the first phonebook (241), whether there are changes recorded in the mobile telephone as changes in progress.

10. A cellular mobile terminal (200), including processing resources (210) programmed to implement the method according to one of claims 2, 3,1,4,6,7 to 9.

\* \* \* \* \*